Dec. 22, 1953  G. J. HECKMAN ET AL  2,663,310
CONTROL FOR APPARATUS FOR DISPENSING
COMPRESSED FLUID IN PULSES
Filed July 1, 1952  4 Sheets-Sheet 1
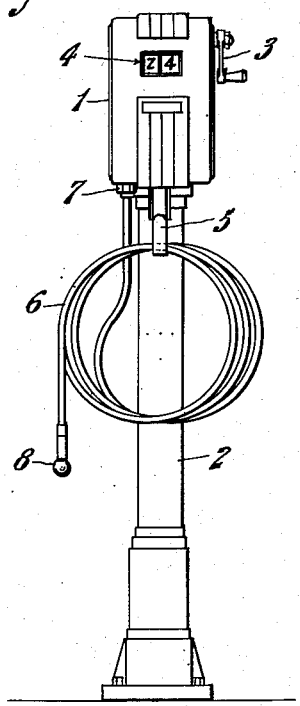
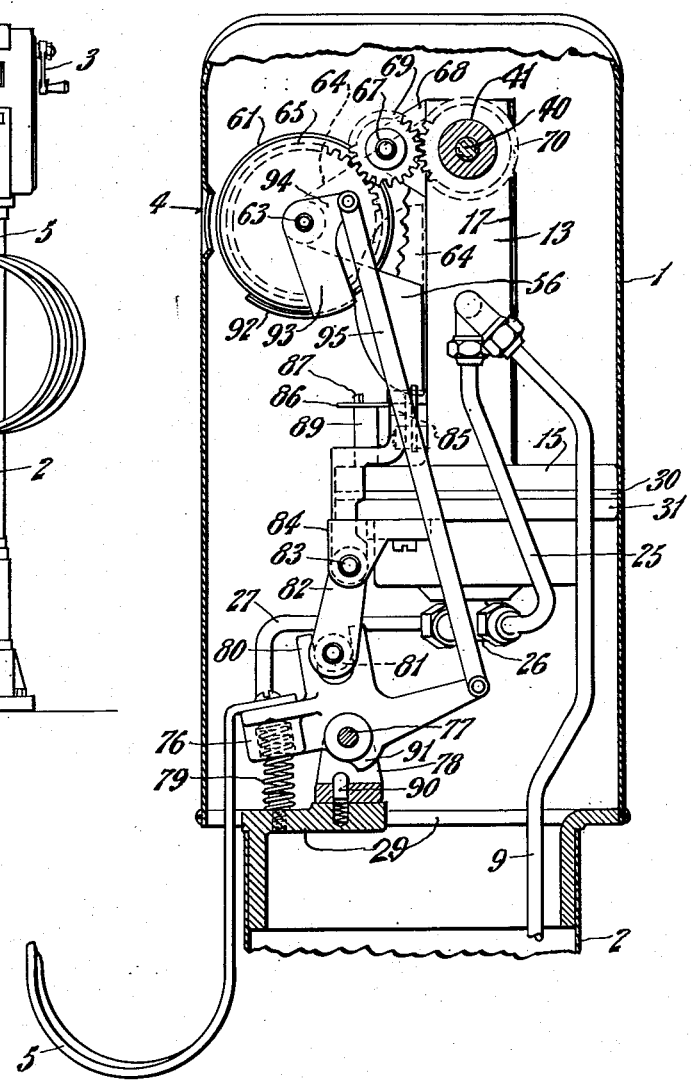
INVENTORS,
George J. Heckman and
Edward M. Paterwic,
BY Chapin & Neal
ATTORNEYS Dec. 22, 1953

G. J. HECKMAN ET AL
CONTROL FOR APPARATUS FOR DISPENSING
COMPRESSED FLUID IN PULSES 2,663,310

Filed July 1, 1952

INVENTORS,
George J. Heckman and
Edward M. Paterwic,
BY Chapin + Neal
ATTORNEYS

INVENTORS,
George J. Heckman and
Edward M. Paterwic,
BY Chapin & Neal
ATTORNEYS

Dec. 22, 1953 G. J. HECKMAN ET AL 2,663,310
CONTROL FOR APPARATUS FOR DISPENSING
COMPRESSED FLUID IN PULSES
Filed July 1, 1952 4 Sheets-Sheet 4

INVENTORS,
George J. Heckman and
Edward M. Paterwic,
BY Chapin + Neal
ATTORNEYS

Patented Dec. 22, 1953

2,663,310

UNITED STATES PATENT OFFICE 2,663,310

CONTROL FOR APPARATUS FOR DISPENSING COMPRESSED FLUID IN PULSES

George J. Heckman, Longmeadow, Mass., and Edward M. Paterwic, Thompsonville, Conn., assignors to Gilbert & Barker Manufacturing Company, West Springfield, Mass., a corporation of Massachusetts Application July 1, 1952, Serial No. 296,656

4 Claims. (Cl. 137—225)

This invention relates to improvements in apparatus for dispensing fluid under pressure in successive pulses through a dispensing conduit, which includes a terminal flexible hose section, into a suitable receiver, that is to be serviced, until the pressure in the receiver reaches a predetermined value, for which the apparatus is set, when the flow of fluid is automatically cut-off.

While capable of other applications, the invention finds one advantageous use in dispensing compressed air for the inflation of pneumatic tires. Such apparatus includes an automatic control that can be manually adjusted for the desired pressure, to which the tire is to be inflated, and that successively opens and closes a valve in the dispensing conduit to supply the air in pulses to the tire until the predetermined pressure is attained, when the valve closes and remains closed until the dispensing conduit is connected to another tire that needs inflating. One prior art example of an apparatus of this type will be found in the Penn Patent No. 1,618,953, granted February 22, 1927.

In the prior art apparatus, the extent of each pulse of compressed air is governed by a restricted orifice in a timing valve, which controls the flow of air in the air motor that operates the dispensing valve, and by a restricted orifice in the valve stem of the tire. The last-named restricted orifice causes a back-pressure to be built up in the dispensing conduit and in the pressure chamber of the air motor and in a short time this pressure becomes sufficient to actuate the motor and close the dispensing valve. A difficulty in the prior art apparatus is that the volume of the hose is included in that part of the apparatus which does the metering, and the hose, because its volume can vary with its elasticity, presents a variable factor which precludes the closely controlled inflation by small increments that is essential for close accuracy of inflation of modern low-pressure tires.

The invention has for one object the provision in an apparatus of the class described, of means, whereby the control of the duration of the pulses is made independent of the hose and thus unaffected by changes in its volume due to its elasticity, thereby enabling inflation to be effected in shorter pulses of smaller pressure increments to secure inflation with the close accuracy that is necessary with modern low-pressure tires.

The invention also has for an object the provision, in an apparatus of the class described, having a hose-supporting lever movable under the weight of the hose into a position to hold the dispensing valve closed independently of the automatic control and automatically movable into a second position, when the weight of the hose is removed therefrom, to release said valve for movement by the automatic control, of a member for holding the dispensing valve in open position independently of the automatic control and operable by manual movement of said lever beyond its second and normal operating position to a third position.

The invention also has for an object the provision in an apparatus of the class described, of a shutter for concealing the indications of the indicator, that shows the pressure for which the apparatus is set, when the hose-supporting lever is manually moved to its third position to hold the valve in open position against the action of the automatic control.

These and other objects will more particularly appear from the following description of the one illustrative embodiment of the invention shown in the accompanying drawings, in which Fig. 1 is a small-scale exterior elevation of a tire-inflating apparatus embodying the invention;

Fig. 4 is a side-elevational view, taken from the right of Fig. 2;

Figure 2:
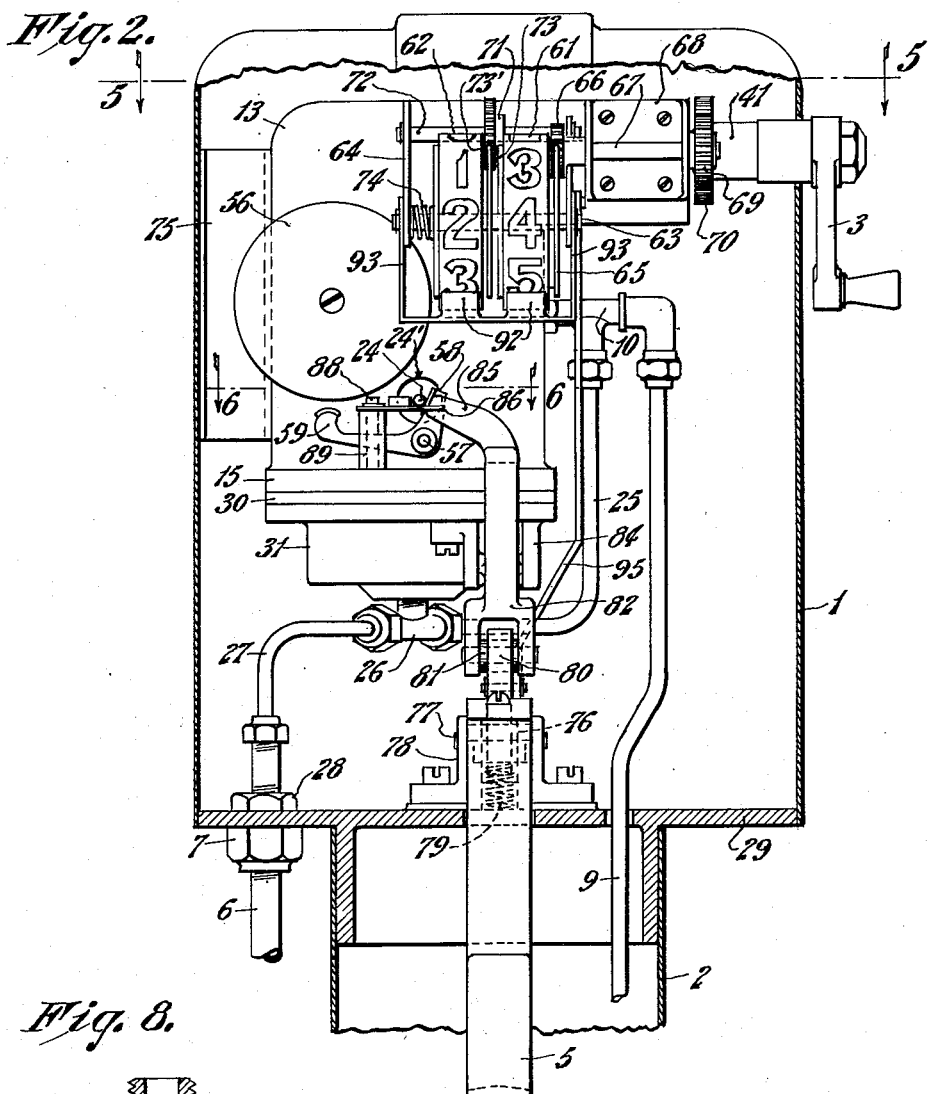
Fig. 2 is a fragmentary front-elevational view, drawn to a larger scale, of the apparatus, the housing being broken open to show the pressure-indicating number wheels, bell, clapper, and a novel form of hose-hook-actuated valve-operating linkage.

Referring to these drawings, the apparatus is usually mounted within a housing 1, such as shown in Fig. 1, which housing is fixed to the upper end of a hollow pedestal 2. Outside the housing is a hand crank 3, adapted to be turned to set the apparatus for the pressure to which a tire is to be inflated. Such pressure is shown by an indicator which is visible through a window 4 in the housing. Also located outside the housing is a hook 5, adapted to support the dispensing hose 6, when not in use, and adapted to move under the weight of the hose, as will later appear, to effect certain functions. One end of this hose is connected to an outlet fitting 7, fixed to the base of the housing 1. The other end of the hose carries the usual chuck 8 for attachment to the tire to be serviced.

Figure 3:
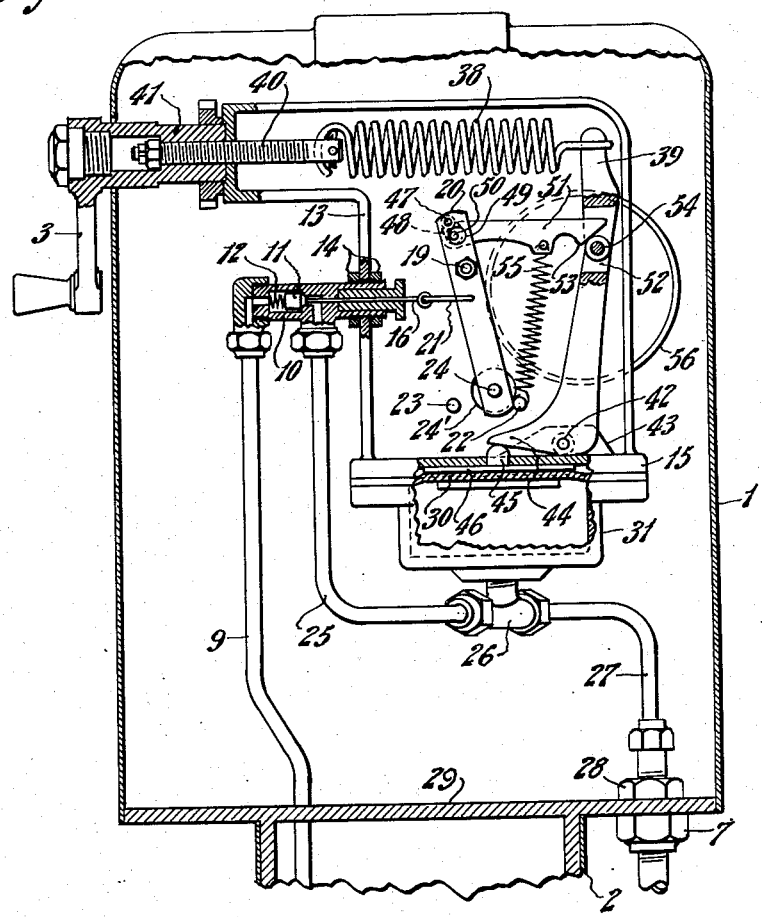
Fig. 3 is a fragmentary rear-elevational view, the housing being broken open to show the automatic valve-operating mechanism.

Referring next to Fig. 3, there is shown an apparatus, which is generally like that of said patent, except for certain improvements to be later described, and which is adapted for dispensing compressed air in pulses through hose 6 to a pneumatic tire. A conduit 9, which is adapted for connection to a storage tank (not shown) of air under pressure and which may extend upwardly through the hollow pedestal 2, is connected to the inlet of a valve casing 10, containing a valve 11, yieldingly held in closed position by a spring 12. This casing 10 has an exteriorly-threaded portion which passes through a side wall of a hollow housing 13 and is clamped thereto by a pair of nuts 14. The housing 13 is integral with and upstands from a circular base 15. The valve 11 has a stem 16 which extends out of casing 10 through a suitable stuffing box into the interior of housing 13. The latter is normally closed by a thin plate 17 (see Fig. 5), held in place by a thumb nut 18 threaded on a stud 19, fixed to the rear wall of housing 13.

This stud 19 (Fig. 3) also serves as the fulcrum of a lever 20, which is connected at a point slightly below the fulcrum by a link 21 to the valve stem 16. The lower end of this lever is movable between two stop pins 22 and 23 and, when the valve 11 is closed, the lever is held against the stop pin 22. The lower end of lever 20 has fixed thereto a pin 24, which extends through a hole 24′ in the back wall of housing 13 for purposes to be later described. The outlet of valve casing 10 is connected by a conduit 25, a T 26 and a conduit 27 to the described outlet fitting 7, which is clamped by a nut 28 to a member 29, which forms the base of outer housing 1 and which is fixed as indicated in the upper end of pedestal 2. The dispensing conduit therefore includes the conduit 25, T 26, conduit 27, outlet fitting 7, hose 6 and the chuck 8, which closes the outer end of the dispensing conduit except when the chuck is applied to the valve stem of the tire to be serviced.

Figure 9:
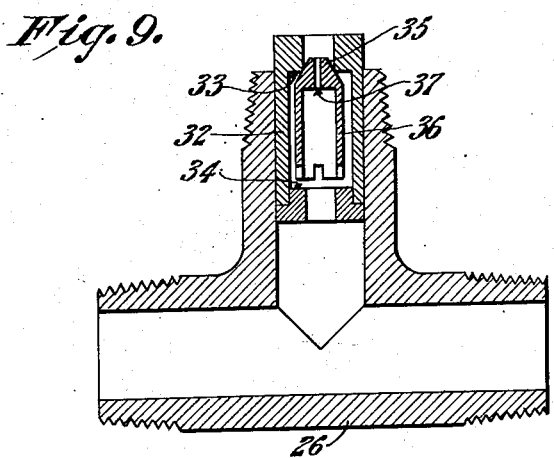
Fig. 9 is a sectional view showing the timer valve.

The valve 11 is actuated by a spring-opposed fluid-pressure motor which includes a diaphragm 30, marginally clamped, as indicated, between the described base 15 and a cup-like casing 31. The latter is connected to the branch of the described T 26 and contains the usual timer valve, which is best shown in Fig. 9. A sleeve 32, fixed in the bore of the branch of T 26, has upper and lower shoulders 33 and 34, respectively, in its bore. The timing valve 35 is formed on the upper end of a smaller sleeve 36 located in sleeve 32 between the shoulders 33 and 34 and normally resting on the lower shoulder 34. The valve 35 has a restricted orifice 37 therethrough. With valve 35 open and the lower end of its sleeve 36 resting on the lower shoulder 34, air can flow freely out of the cup 31. However, when air is admitted to the T 26, it forces the valve 35 against its seat and compels all the air to pass through the restricted passage 37, wherefore it takes a substantial time for enough air to enter the cup to press the diaphragm 30 upwardly.

The diaphragm 30 (Fig. 3) is moved downwardly by means of a loading spring 38, located in the upper part of housing 13 and interconnecting the upper end of the long upstanding arm 39 of a bell crank to the inner end of a screw 40. The other end of this screw carries a nut 41, formed in the hub of the described hand crank 3 and bearing against the outer face of a side wall of the housing 13. The bell crank is fulcrumed on a pin 42 fixed in lugs 43 upstanding from the top of the base 15. The short and horizontal arm 44 of the bell crank bears on the upper end of a pin 45 which is fixed to a disk 46 on diaphragm 30 and which extends through a hole in the base 15. By turning crank 3, the tension of spring 38 and the downward force applied to diaphragm 30 can be adjusted as desired.

The bell crank is arranged to move lever 20 and the valve 11 with a snap action by the following means. Pivotally connected to the upper end of lever 20 at 47 are a pair of short links 48. In the lever is a hole 49; and a pin 50, which pivotally connects the lower ends of the two links 48 to one end of an arm 51, has an end that extends into hole 49. The latter is larger in diameter than the pin 50, so that the pin is free to move a short distance limited by its abutment with the walls of the hole as stops. A slight swinging movement of links 48 is thus permitted. The arm 51 extends through a slot 52 in the upstanding arm 39 of the bell crank and has a V-shaped point 53, adapted to coact with a roller 54, mounted on the arm 39 and located in slot 52. A spring 55 connects arm 51 to the stop pin 22 and yieldingly holds the arm in engagement with the roller. The parts are shown in their normal rest positions, assuming the dispensing conduit to be filled with compressed air. The valve 11 is closed. When the chuck 8 is applied to the stem of a tire, the pressure in the dispensing conduit and diaphragm chamber will decrease, causing spring 38 to move the bell crank counterclockwise, carrying roll 54 along the right hand side of the V-shaped point 53 until it crosses the point, whereupon spring 55 will pull arm 51 downwardly and by coaction with the roll cause lever 20 to be suddenly swung clockwise to open valve 11. Compressed air will then be admitted through the valve 11, pipe 25, T 26 and into the cup-like casing 31, slowly raising the diaphragm 30. The bell crank moves clockwise, stretching spring 38 and the roll 54 rides along the left hand side of the V-shaped point 53. When the roller passes the point, spring 55 will pull the arm downwardly causing the right hand side of the V-shaped point to ride down on the roll and force the arm 51 suddenly to the left, thus rocking lever 20 counterclockwise to close valve 11.

Fixed, as indicated in Fig. 2, to the front wall of housing 13 is a bell 56 and pivoted at 57 to such wall is a bell crank having an arm 58 adapted to be engaged by the described pin 24 and an arm 59 adapted to tap the bell 56. The pin 24, which moves with valve lever 20, extends through the hole 24′ in the housing 13 that affords freedom for the necessary movement of the pin.

The pressure for which the apparatus is set, is indicated by two number wheels 61 and 62 (Figs.

2 and 5), which are mounted to rotate on a shaft 63, fixed at its ends in the outstanding arms of a U-shaped bracket 64, fixed to the front wall of housing 13. These wheels, which are numbered 0 to 9 in the usual manner, are turned by crank 3. The units wheel 61 has a gear 65, which meshes with a pinion 66 fixed on one end of a shaft 67, rotatably mounted in a bracket 68 fixed to said front wall. Fixed on the other end of shaft 67 is a pinion 69 which meshes with a gear 70 fixed on the nut 41 that is operated by crank 3. The tens wheel 62 is turned by the wheel 61 one-tenth of a revolution at the end of each revolution of the wheel 61. This is effected in the usual manner by the usual transfer gear 71 which is fixed on a counter shaft 72, mounted in bracket 64. This gear 71 has a portion which meshes with a segmental gear 73 fixed to number wheel 61 and another portion which meshes with a gear 73' fixed to number wheel 62. The number wheels are manually shiftable axially to the left, as viewed in Fig. 2, for setting purposes. Such movement disengages the number wheel gears 65 and 73 from their respective driving members 66 and 71 and enables them to be turned for calibration purposes. A spring 74 on shaft 63 normally holds the number wheels in their illustrated positions in which they will be turned whenever crank 3 is turned. The drive is, of course, reversible. The gearing between the crank and number wheels is made such that these wheels indicate in pounds the pressure for which the loading spring 38 has been set by turning crank 3. That is a tenth of a revolution of wheel 61 indicates a change of one pound per square inch in the tension of spring 38.

Figure 5:
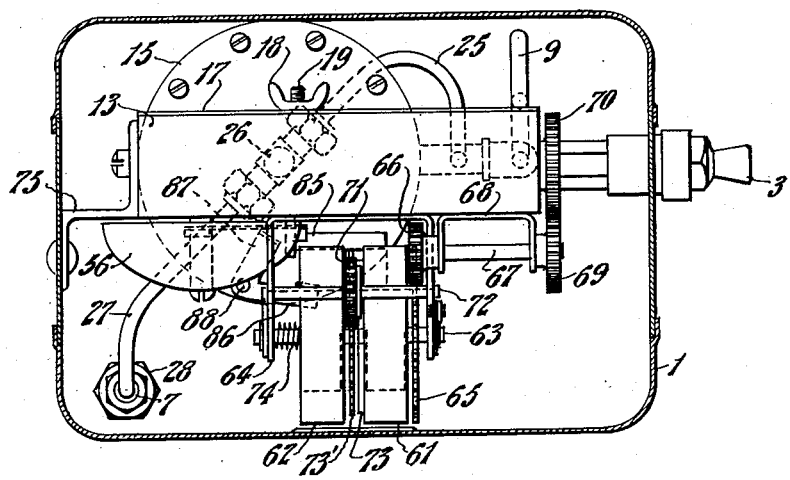
Fig. 5 is a sectional plan view taken on the line 5—5 of Fig. 2.

The inner housing 13 is suitably supported from the outer housing 1, as by means of the Z-shaped bracket 75 (Figs. 2 and 5) and the screws indicated. The housing 1 is preferably made in separable sections, as shown in Fig. 5, which are readily removable to allow access to the front or the back of the inner housing 13 as required.

Figure 6:
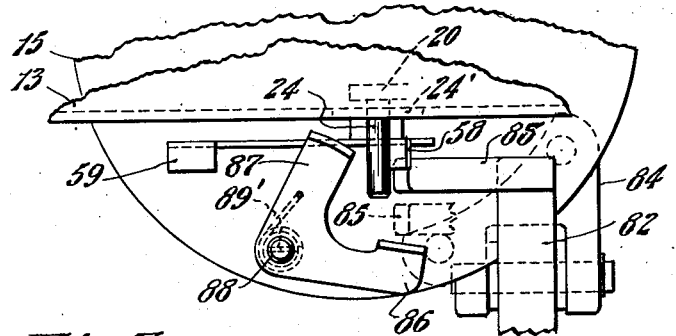
Fig. 6 is a sectional plan view, taken on the line 6—6 of Fig. 2.

The hose hook 5 is arranged to move under the weight of the hose 6, suspended thereon and hold the valve 11 in closed position. As shown in Fig. 4, the hook 5 is fixed to an arm 76 of a lever, which is pivoted intermediate its ends on a pin 77, mounted at its ends in the spaced upstanding arms of a bracket 78, fixed to the base 29 of housing 1. A spring 79 acts between this base and arm 76 tending to hold the latter in a position such as to allow valve 11 to open. This lever has an upturned arm 80 with an open-ended slot therein to receive a roll 81 carried by the forked lower end of a lever 82, pivoted intermediate its ends on a pin 83 to a bracket 84, fixed to casing 31. The upper end of lever 82 has a laterally-turned part 85 (Fig. 2), which can swing into and out of the path of the actuating arm 58 of the bell clapper, as best shown in Fig. 6. When moved into the path of arm 58, it prevents movement of this arm to the right as viewed in Figs. 2 and 6 and thus movement of the pin 24 in the same direction, thereby preventing movement of the valve lever 20 in the direction necessary to cause opening of valve 11. The pin 24 is held against movement in the other direction by the stop pin 22 against which the lever 20 abuts when valve 11 is closed. When the hose 6 is removed from hook 5, the spring 79 will move lever 82 and its arm 85 into position to release pin 24 for free movement. As viewed in Fig. 6, the part 85 moves away from housing 13 until it lies beyond the outer end of pin 24 as indicated by dotted lines.

Figure 7:
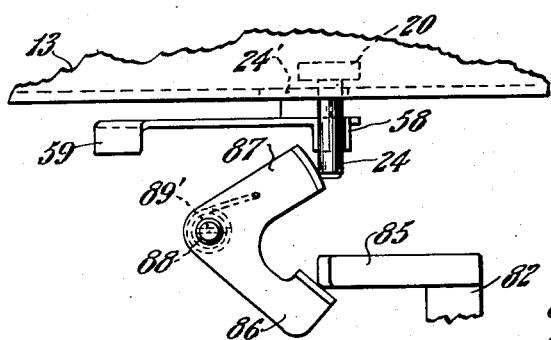
Fig. 7 is a view taken similarly to Fig. 6 but showing certain parts in other positions.

It sometimes happens that the full pressure of the tank is desired and then it is desirable to lock valve 11 in open position, when the apparatus is said to be in "full tank" position. To effect this result, this invention provides for the hose hook lever to be manually moved clockwise beyond the position to which it is automatically moved by spring 79, when the hose 6 is removed therefrom and this additional movement of the hose hook lever causes the part 85 of lever 82 to move still further away from casing 13 from the dotted line position shown in Fig. 6 to the position shown in Fig. 7, thereby engaging one arm 86 of a bell crank lever and moving the latter to carry its other arm 87 against the pin 24 to hold it and the lever 20 in the position in which valve 11 is open. This bell crank lever is pivotally mounted at 88 on a post 89 fixed to base 15. The bell crank lever is normally held in the Fig. 6 position by means of a spring 89'.

To yieldingly retain the hose hook lever 76 in the "full tank" position, a spring-pressed detent 90 (Fig. 4) is mounted in the bracket 78 in the path of a cam 91 formed on the lower part of the lever. The detent serves as a stop to be engaged by the cam when the hose hook lever is moved from the "off" position shown to its normal operating position. The spring 79 is not able to move the lever beyond the last-named position. However, the resistance of the detent can be overcome by manual upward pressure on the lever 76 to move the latter into the "full tank" position in which the detent 90 presses on the periphery of the cam 91 to frictionally retain the lever 76 in the position to which it has been moved.

When "full tank" operation is used, it is desirable to conceal the pressure indication of the number wheels 61 and 62 and also apprise the customer that the apparatus is set for the "full tank" operation. For these purposes, a shutter 92 (Figs. 2 and 4) is provided. This shutter is connected to and extends between the outer ends of two arms 93, which are pivoted at their inner ends on the number wheel shaft 63 and which are disposed one adjacent the outer face of each arm of the bracket 64. One arm 93 has a right-angular extension 94 (Fig. 5) which is connected by a link 95 to the hose hook lever 76. While the shutter 92 moves back and forth with the hose hook lever, when the latter is moved between its "off" and normal operating positions, it is not then moved far enough to come between the window 4 and the number wheels. When, however, the hose hook lever is moved to "full tank" position, the shutter 92 moves up far enough to lie between the window 4 and the number wheels 61 and 62, thereby concealing the pressure indications on the latter. The shutter may also have marked on its outer face the words "Full Tank," or some other suitable indication, which will be displayed through window 4 when the shutter is in its uppermost and indicator-concealing position.

Figure 8:
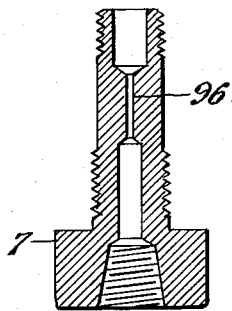
Fig. 8 is a sectional view of the hose connection fitting, showing the restricted outlet passage.

An important feature of this invention consists in improving the accuracy of the timing of the pulses of compressed air supplied to a tire so that they are more nearly uniform in duration, and in shortening the pulses to enable more accurate inflation to be had, especially with the low pressure tires now commonly used. These results are secured by providing a flow-limiting restricted orifice in a relatively inelastic portion of the conduit between the T 26 and the entrance end of hose 6. This orifice has been shown at 96 (Fig. 8) in the outlet fitting 7 to which the entrance end of hose 6 is connected. The cross sectional area of this orifice, in this particular example, is .0465". The flow-limiting restricted orifice 37 in the timer valve has a cross sectional area of .031", in this particular example. The orifice 96 approximates in area that of the restricted orifice in the stem of a standard tire valve. This orifice 96 is preferably somewhat larger in area than the orifice 37 in the timer valve. In the operation of the usual compressed-air service apparatus, such for example as that of the above-identified patent, the restricted passage in the tire valve cooperates with the restricted passage 37 in the timer valve to govern the duration of the pulses of compressed air dispensed to the tire. There is no restriction such as 96. In the usual operation, when the main valve 11 opens, air flows from the hose 6 into the tire at a rate which is limited by the size of the orifice in the tire valve. Pressure builds up rapidly in the discharge conduit, including the hose, because the rate of outflow to the tire is restricted. The timer valve 35 is lifted to its seat by the initial rush of air and thereafter the rate of flow into the diaphragm chamber is controlled by the size of orifice 37. Air flows into the tire at a greater rate than into the diaphragm chamber because the restricted orifice in the tire valve is larger than the orifice 37 in the timer valve. As the pressure on the diaphragm 30 increases sufficiently, the main valve 11 is caused to close with a snap action, cutting off the flow. The pressures in the tire, in the discharge conduit and in the diaphragm chamber then equalize, which lowers the pressure in the diaphragm chamber, causing the main valve 11 to open and admit another pulse of air. This operation of opening and closing valve 11 continues until the tire is inflated to such an extent that the pressure in the diaphragm chamber will not drop enough to cause opening of the main valve.

The difficulty with the usual apparatus, referred to, is that the hose is included between the flow-limiting orifice in the tire valve and the timer valve 35. The hose is a variable factor because, being elastic, it is extensible and expansible. The degree of elasticity of the hose will vary with its age. Changes in the timing of the pulses occur because of the variations in the volume of the hose. As a hose ages, its elasticity will change and cause a change in the length of the pulse. Substitution of a hose of one length for another will sometimes effect a change. Thus, because of the hose close uniformity in the duration of the pulses cannot be had.

This invention overcomes the difficulty by providing the restricted orifice 96 in a relatively inelastic part of the discharge conduit. The timing is then controlled by this orifice 96 instead of by the orifice in the tire valve and uniformity in the duration of the pulses is thus insured. Any changes that occur in the hose will not affect the timing. Also, the volume of the metering portion of the system, that is, that portion between the main valve 11, and the two flow-limiting orifices 37 and 96, has been reduced as well as made fixed. As a result, a speedier action can be had and the pulses thereby made of shorter duration and smaller pressure increments which is very desirable in the inflation of modern low-pressure tires. The apparatus of this invention inflates the tire by pulses of from .5 to .75 p. s. i., as against the prior art apparatus in which the pulses are from 1.5 to 2 p. s. i. In practice, the present apparatus will inflate a tire with close accuracy and the variation is never more than .5 p. s. i., and often much less. With a tire calling for 25 p. s. i. inflation, the prior art apparatus varying by as much as 2.5 p. s. i., can result in a 10% error of over or under inflation while the apparatus of this invention, the maximum error is 2½%. Another disadvantage with the long pulse of the prior art apparatus is that of the so-called "after pulse," which occurs when a tire has been inflated close but not quite to the desired pressure and the main valve 11 opens to give an additional pulse, that may result in over inflation to as much as 2 p. s. i. With the materially shortened and smaller pulses, over inflation seldom occurs and, if and when it does, it is so small in degree as to be negligible.

The invention thus provides an improved compressed-air servicing apparatus, which is particularly useful in the inflation of low pressure tires and which is characterized by a small and fixed volume in the metering portion of the discharge conduit, eliminating therefrom the volume of the hose and resulting in uniform short pulses which result in close accuracy of inflation.

What is claimed is:

1. In apparatus for dispensing compressed fluid in pulses through a dispensing conduit, which has a first and relatively inexpansible section and a second flexible and relatively expansible terminal section for connection to a receiver to be serviced, and wherein the flow through the conduit is started and stopped by a valve in the first section of the conduit that is opened and closed by a spring-opposed fluid-pressure motor, having a chamber connected by a single and relatively inexpansible third conduit section to the first conduit section between said first-named valve and the second conduit section, and wherein a timing valve located in said third conduit section has a flow-limiting orifice of restricted cross sectional area therethrough enabling flow through the timing valve when closed, the improvement which consists in providing a second flow-limiting orifice of restricted cross sectional area in the first conduit section between said third and second conduit sections, whereby the duration of the pulses is controlled by two orifices which are interconnected by relatively inexpansible sections of the dispensing conduit.

2. The combination, as claimed in claim 1, in which the second flow-limiting orifice is larger in cross sectional area than the first flow-limiting orifice.

3. In apparatus for dispensing compressed fluid in pulses through a dispensing conduit, including a flexible hose, of the type wherein a valve in the conduit is opened and closed by a fluid-pressure motor responsive to the conduit pressure and having a loading spring, the pressure of which is variable by manually-operated means, connected to actuate an indicator, showing the pressure for which the spring is set, and a hose-hook lever, which is movable from a first to a second position, accordingly as the weight of said hose is or is not imposed thereon, operates a member which holds said valve closed when the lever is in its first position; the improvement consisting of yieldable means for arresting said lever in its second position when moved thereto from its first position, said means being yieldable by manual pressure on the lever to enable it to be moved beyond the second position to a third position, and a member connected to and movable by said lever, when moved from its second to its third position, to hold said valve in open position against the action of said motor.

4. The combination as claimed in claim 3, in which a shutter is connected to said hose-hook lever to be moved thereby from a position in which it conceals the indications of said indicator when the lever is in its third position to positions in which it does not conceal said indications when the lever is in its second and first positions.

GEORGE J. HECKMAN.
EDWARD M. PATERWIC.

References Cited in the file of this patent

UNITED STATES PATENTS

| Number | Name | Date |
| --- | --- | --- |
| 1,719,836 | Fisher | July 9, 1929 |
| 1,814,206 | Donkin | July 14, 1931 |
| 1,974,853 | Ragan | Sept. 25, 1934 |